United States Patent [19]
Duke

[11] 3,898,859
[45] Aug. 12, 1975

[54] APPARATUS AND METHOD FOR THE PREPARATION OF SOFT SERVE PRODUCTS

[75] Inventor: Gene S. Duke, Moline, Ill.

[73] Assignee: H. C. Duke & Son, Inc., East Moline, Ill.

[22] Filed: Feb. 13, 1974

[21] Appl. No.: 442,219

[52] U.S. Cl. .................. 62/135; 62/201; 62/303; 62/233
[51] Int. Cl.[2] .................. F25D 29/00; A23F 9/02
[58] Field of Search ............ 62/135, 525, 201, 211, 62/348, 233

[56] References Cited
UNITED STATES PATENTS

| | | | |
|---|---|---|---|
| 2,896,421 | 7/1959 | Radep | 62/135 |
| 3,267,688 | 8/1966 | Carpigiani | 62/348 X |
| 3,462,968 | 8/1969 | Puta et al | 62/348 |

*Primary Examiner*—William E. Wayner
*Attorney, Agent, or Firm*—Harbaugh and Thomas

[57] ABSTRACT

A self contained dispenser for soft serve ice cream is disclosed having a freezing chamber and a mix storage chamber. A single compressor-operated refrigerant unit cools both chambers with means to operate each chamber independently. The freezing chamber is provided with dual thermostatic control, one set for low temperature operation during periods of use and the other set for a medium preserving temperature for during periods of non-use of the dispenser. The beater motor in the freezing chamber may be operated only when product is being dispensed or when the freezing chamber requires refrigeration to maintain the freezing temperature. A "night switch" is provided so that only the compressor is activated during these periods to provide refrigeration for both chambers and the mix storage, cutting out the beater motor as desired. This protects the product in the freezing chamber from excess beater action during periods of non-use which would otherwise destroy its consistency and taste. The dispenser is easily cleaned and sterilized periodically without the necessity of dismantling.

7 Claims, 5 Drawing Figures

APPARATUS AND METHOD FOR THE PREPARATION OF SOFT SERVE PRODUCTS

BACKGROUND OF THE INVENTION

The prior art shows a wide variety of devices for the preparation of frozen confections. The YUZA U.S. Pat. No. 3,626,709 discloses a self-contained apparatus for blending, freezing and dispensing a carbonated homogeneous ice mixture which has a cabinet with a lower compartment housing cylinders of flavoring syrup and carbon dioxide and a pump to convey these ingredients to a blender that is connected to the freezing and dispensing chamber. The storage compartment is not refrigerated and there is no disclosure of means whereby the machine can be placed in stand-by condition.

BERKOWITZ et al. in their U.S. Pat. No. 2,598,751 describes a beer dispensing system wherein beer kegs are provided in a remote walk-in cooler and connected through refrigerated conduits to a dispenser. BERKOWITZ et al. do not provide a self-contained unit and the problems of product deterioration are quite different.

WOODRUFF U.S. Pat. No. 2,608,833 describes an ice cream machine that includes a refrigerated storage compartment disposed above a freezing chamber. The mix composition is poured into the refrigerated compartment where it is agitated and conveyed into the freezing chamber for dispensing. Both the storage compartment and the freezing chamber are cooled by a common refrigeration system and agitation is provided in both zones. A mechanical linkage is provided to automatically supply refrigerated mixture from the storage chamber to the freezing chamber in amounts that equal that withdrawn from the freezing chamber. Cleaning and sterilization of the device require partial dismantling and no provision is made for placing the machine in stand-by condition during periods of non-use.

IRWIN U.S. Pat. No. 2,594,442 discloses another type of ice cream manufacturing device wherein only the freezing chamber is refrigerated. The mix composition is poured into a hopper and pumped from the hopper into the freezing chamber. There is no disclosure of refrigeration means for the hopper or stand-by control. Other patents of only general interest are KENNERY U.S. Pat. No. 1,298,962; BERNSTEIN et al U.S. Pat. No. 3,256,100; ENTLER U.S. Pat. No. 2,721,450 and BEHLING U.S. Pat. No. 2,903,929.

In apparatuses of these types, particularly soft serve ice cream dispensers, there is considerable waste of mix composition, because, during stand-by periods, such as over night, the product in the freezing chamber is periodically agitated each time the refrigeration system turns on in order to prevent solidification of the product. This intermittent agitation and cooling deleteriously affects the texture, taste and appearance of the product in the freezing chamber. Furthermore, because of the components used and their arrangements these machines require daily cleaning and sterilization in order to prevent a build-up of bacteria which is prohibited by health standards. This is true of any unrefrigerated parts that come into contact with the mix composition as well as some of the refrigerated parts subject to exposure or temperature fluctuations.

SUMMARY OF THE INVENTION

In accordance with this invention a unitized dispenser for soft service ice cream and like confectionary products is provided, wherein the problems of periodic shut-down and cleaning, product disintegration, sanitation and control are eliminated or mitigated. A single compressor cools both the freezing chamber and the mix storage chamber, operated independently under separate thermostatic controls. The freezing chamber has two thermostatic controls, one set for low temperature operating during periods of use of the dispenser and the other set for medium or refrigeration temperatures for stand-by condition of the dispenser.

The storage chamber is controlled by a single thermostat which regulates its temperature to refrigeration conditions at all times. Means are provided to connect a container of mix composition to a pump located in the storage chamber under sanitary conditions. The mix composition contacts only refrigerated parts of the dispenser from the container to the customer's cup.

A feature of the invention is the provision of switch means, referred to as a "night switch" which when activated places the freezing chamber under the control of the second thermostat whereby it is maintained at a refrigeration temperature during the night or other periods of non-use of the dispenser and switch means to shut off the beater motor for the freezer chamber.

DESCRIPTION OF THE DRAWINGS

An illustrative embodiment of the invention is shown in the drawings wherein.

THE PREFERRED EMBODIMENTS

Figure 1:
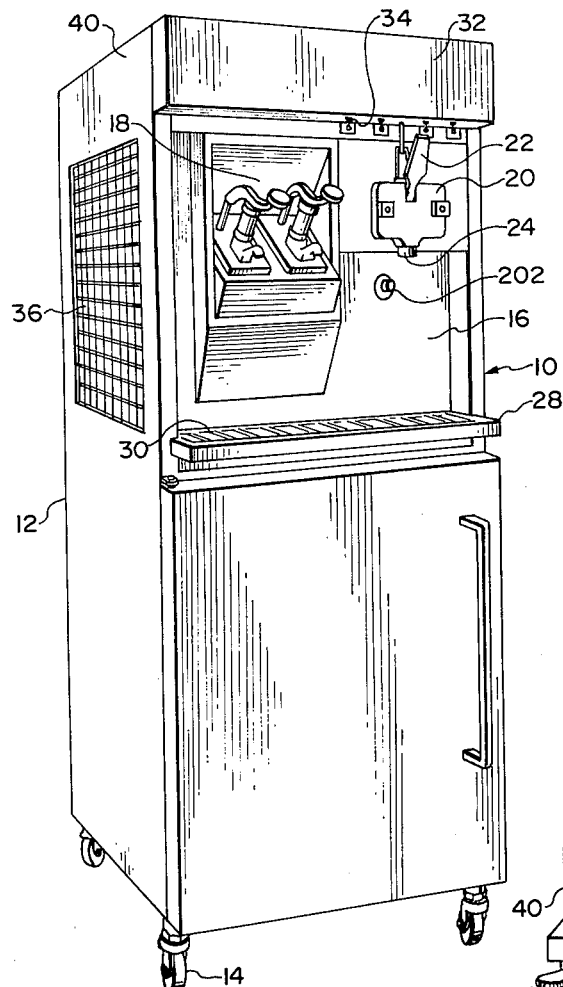
FIG. 1 is a front perspective view of the soft serve dispenser.

Referring to FIG. 1 the soft serve dispenser 10 of this invention is shown to include the insulated cabinet 12, of generally rectangular configuration, and compact construction being about the size of a household refrigerator and mounted on rubber-tired caster wheels 14 for ease in handling. The wheels 14 are removable where it is desired to provide a more permanent floor installation in relation to other food dispensing units.

The cabinet 12 is of double walled construction to provide space for insulating material and provision for ventilation, which latter is to be described. In the top front the panel 16 is recessed and provides an area for the location of a pair of flavored syrup dispenses 18 used to adding topping to the cup of dispensed product, in the manner known in the art.

The dispensing valve 20, with the operating handle 22 and spout 24 is of a known type and provides a manual control for dispensing the frozen product from the freezing chamber 26 (see FIG. 3) into paper cups (not illustrated).

Figure 2:
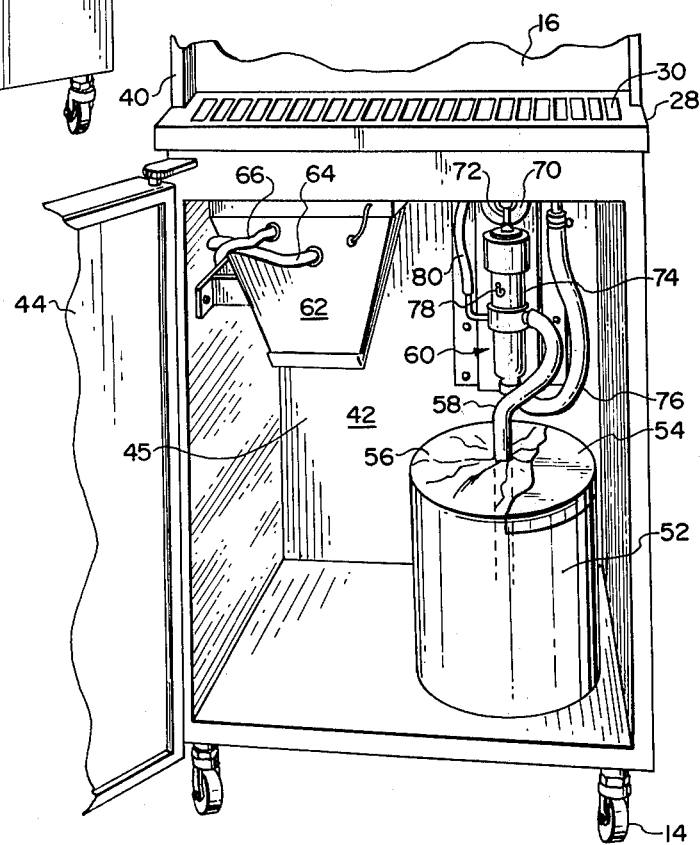
FIG. 2 is a fragmentary view of the lower refrigeration chamber with the door open to show the pump, evaporator coil and mix container arrangement therein.

The recessed panel 16 provides space under the dispensing valve spout 24 for the removable drip tray 28 having a grid 30 over its top surface which is better illustrated in FIG. 2. The top offset of the panel 16 under the front panel 32 just behind the operating handle 22 is a convenient location for the several control switches such as 34, which can be toggle switches as illustrated or push buttons and the like. Suitable identifying labels, not illustrated, are provided for each of these switches.

A pair of grid panels 36 is provided in the side wall 40 of the cabinet which communicate internally with the condenser system to provide venting for air circulation and cooling of the condenser. The grid panels 36 are merely illustrative and can be located in other walls of the cabinet 12.

The bottom half of the cabinet 12 defines the refrigeration compartment 42 with a hinged front door 44 providing access thereto. The refrigeration compartment 42 takes up substantially all of the bottom of the cabinet, except that the intermediate wall 45 is spaced sufficiently from the outer back wall 46 of the cabinet to define the space 48 therebetween for the location of the compressor 50 and drive motor 51 and pump motor 96 outside of the refrigerated space. This is shown in FIG. 3.

Thus, there is adequate room in the compartment 42 for at least two 6-gallon mix composition containers such as illustrated at 52. These containers are prepared and filled by suppliers of soft serve mix composition, are generally constructed of pressed paper or cardboard and have a paper lid 54, cut away to show the thin plastic liners 56 for containment of the liquid mix. The liner has a small 2 inch round removable cap (not shown) at the top opening to hold the gathered plastic in sealed relationship for shipping. The cap, upon removal, provides access for the dip tube 58 coming from the intake of the pump 60, also located in the refrigeration chamber or compartment. Means to hold the gathered top edge of the plastic liner to the dip tube 58 can be used as desired. The dip tube 58 may be provided with a straight non-yielding end portion that extends to the bottom of the container 52 to insure complete withdrawal of the mix from the bottom of the container by the pump 60. The evaporator coil 62 for the system is also located within the refrigeration compartment with its conduits 64 and 66 communicating therewith.

The pump 60 is described in detail in copending application Ser. No. 311,685 filed on Dec. 4, 1972 and assigned to the instant assignee. This is a single piston positive displacement pump for confectionary mix compositions driven by the crank 70 operating the connecting rod 72 to which the piston is connected. The pump 60 has an internal, one-way valve system adapted to draw mix composition and air into the cylinder 74 through the intake tube 58 and from the container 52 and discharge it from the bottom through the discharge tube 76 which communicates with the inlet end of the freezing chamber 26. The air enters through the variable metering orifice 78. The conduit 80 connects from a pressure responsive device, such as a diaphragm, responsive to the pressure in the discharge chamber of the valve system, to a micro-switch controlling the operation of the refrigeration chamber to maintain the system within a prescribed pressure range for control of product consistency and product through-put. This assures that the flow rate or volume of mix composition passing into the freezing chamber is directly proportional to the rate of withdrawal of product and ample residence time in the freezing chamber is allowed to properly freeze the mix and produce a product of uniform characteristics regardless of the demands on the system. Other consistency controls can be used to augment or replace the foregoing such as the torque consistency control described in said YUZA U.S. Pat. No. 3,626,709. Since the functions of these controls are not part of this invention and other means for such control are apparent to one skilled in the art, there is no necessity for further explanation.

Figure 3:
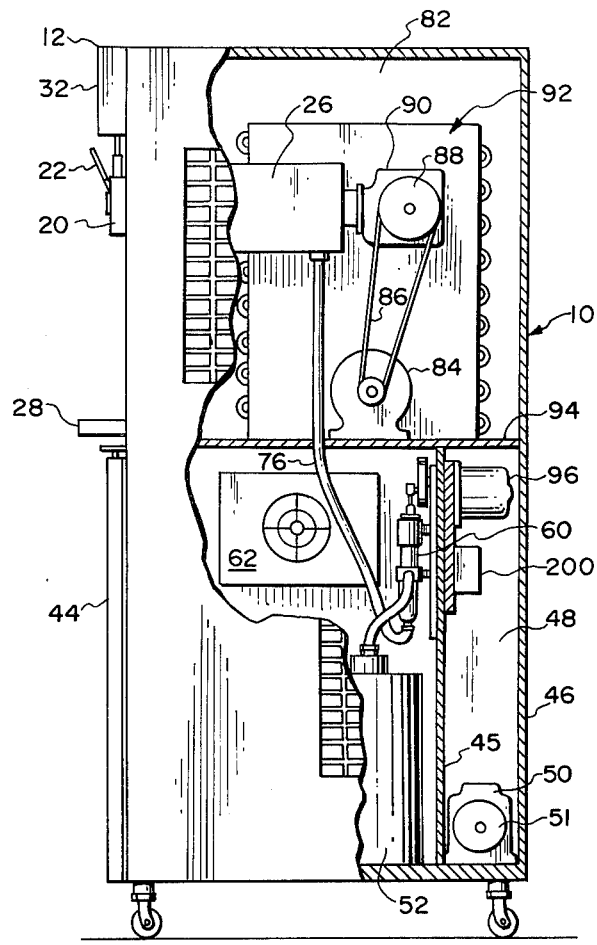
FIG. 3 is a side view of the soft serve dispenser with the cabinet wall cut away to show the arrangement of parts in the top and bottom compartments.

Referring to FIG. 3, a general arrangement of the parts of the dispenser of this invention is illustrated, showing the location of the freezing chamber 26 just behind the dispensing valve 20 within the top cabinet space 82 which is not refrigerated. The discharge conduit 76 from pump 60 leads to the intake end of the freezing chamber. The beater drive motor 84 is connected by the driven belt 86 to the input sheave 88 of the reduction gear 90, in turn connected through its output shaft to the beater (not shown) extending the length of the freezing chamber. The blades of the beater include scraper portions designed to move mix composition against and away from the inner circumferential wall of the chamber so as to produce uniform freezing of the mix. The speed of rotation of the beater is about 50 to 420 rpm depending on the type of product being prepared. In the case of soft serve ice cream, used to illustrate the present invention, the speed of rotation will be about 20 to 100 rpm.

FIG. 3 shows the top portion of the air cooled condenser 92 which is provided with a motor driven fan (not illustrated). The effluent air from the condenser 92 passes in and out of the compartment 82 through the air vent 36. The floor member 94 serves as a support for the foregoing components and divides the upper and lower compartments of the cabinet 12 while the intermediate wall 45 provides support for the pump 60 and its drive motor 96. The position of the evaporator coil ((cooling coil) within the compartment 42 is also shown in FIG. 3, same being located to one side and in the corner out of the way. Liquified high pressure refrigerant from the pressure side of the compressor 50 passes through the condenser 92, into a receiver tank not illustrated in FIG. 3, from the receiver tank through a control valve and an expansion valve to the freezing coil on the freezing chamber. Heat extracted from the mix composition vaporizes part or all of the refrigerant which is again compressed and recycled. Part of the refrigerant from the receiver tank is passed through the evaporator coil 62 of the refrigeration compartment to maintain refrigeration temperatures therein.

The evaporator coil in the freezing chamber 26 is under dual control by means of a pair of thermostats, one holding the temperature at freezing, namely about 18°F and the other, during periods of non-use, holding the freezing chamber at about 38°F for product preservation. A third thermostat is used to control the evaporator 62 at a suitable refrigeration temperature namely about 38°F.

Figure 4:
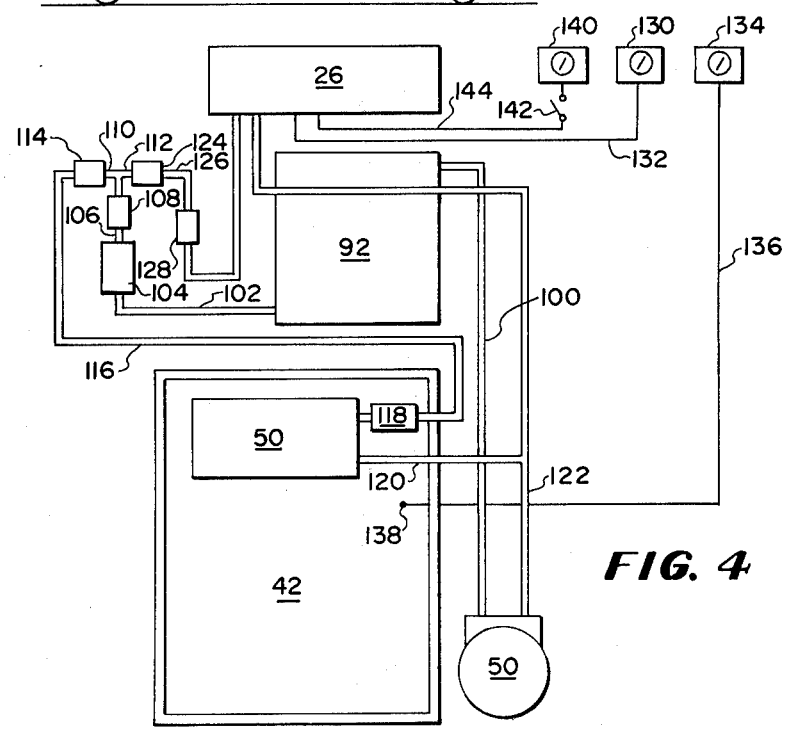
FIG. 4 is a diagrammatic view of the over-all system.

FIG. 4 illustrates the foregoing arrangement diagrammatically wherein the components are shown with appropriate connections. The pressure line 100 connects the discharge side of the compressor 50 to the condenser 92, and thence via the line 102 to the receiver tank 104. The discharge line 106 from the tank 104 connects through the drier and sight glass 108 to branch lines 110 and 112. The former is controlled by the solenoid valve 114, connected by means of the line 116 to the expansion valve 118 leading to the evaporator coil 50, and via branch line 120 to intake or suction line 12 communicating with the compressor 50.

The latter branch line 112 is controlled by the solenoid valve 124 connected to the line 126 to the second expansion valve 128 communicating with the inlet side of the evaporator (freezer) coil within the freezing chamber 26. Discharge from this coil passes into the suction line 122.

The thermostat 130 senses the temperature within the freezing chamber 26 by a thermo-couple connected thereto by means of electrical lead 132. The thermostat 134 senses the temperature in the refrigeration chamber 42 by means of the electrical lead 136 connected to a thermostatic element therein, indicated at 138. The thermostat 140 connects with the night switch 142 through the electrical lead 144 to a third thermo-couple (not illustrated) within the freezing chamber 26.

The thermostats 130 and 134 are set to control the freezing chamber and the refrigeration chamber respectively at a temperature of about 38°F during periods of non-use, while the thermostat 140 is set to control the temperature of the freezing chamber at about 18°F during periods of use. The night switch 142 is normally open during periods when freezing temperatures are not required in the freezing chamber and the system is under the control of the thermostats 130 and 134 during such non-use periods. Closing the night switch, disconnects the thermostat 130 and places the freezing chamber under control of the thermostat 140. The refrigeration chamber 42 is under the control of the thermostat 134 at all times.

Figure 5:
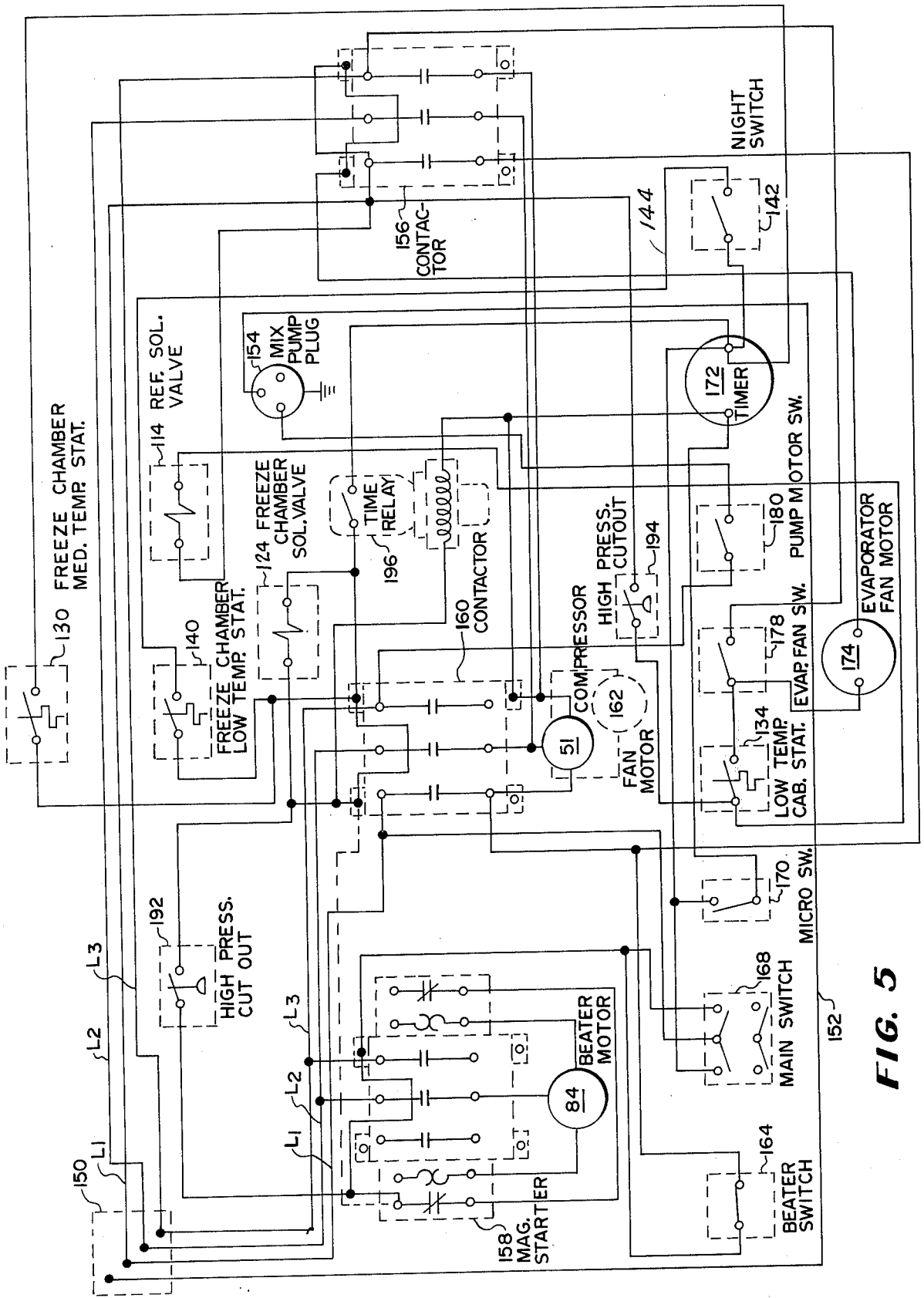
FIG. 5 is an electrical diagram to illustrate one form of control arrangement.

The circuitry for the system is shown in FIG. 5 wherein the various parts controlled thereby are shown diagrammatically in somewhat simplified form with numerical identification of the main electrical components conforming to FIG. 3 and the major lead wires. It should be apparent from the diagram and the following brief description how the controls operate.

In the upper left hand corner of FIG. 5, the reference numeral 150 represents a source of 230 volt three-phase 60 cycle current, with 115V for pump operation being obtained by connecting pump outlet plug 154 to $L_3$ at contactor 160 through pump switch 180 and to neutral ground. The system can also be operated on 230 volt single phase current.

The hot lead and the leads, $L_2$ and $L_3$ enter the circuit along the top of the diagram, connecting to the contactor 156 on the right side, the magnetic starter 158 on the left side, and the contactor 160, central of the diagram. The starter 158 is an overload relay for the three-phase beater motor 84. Similarly, the contactors 160 and 156 are relay-type controls respectively for daytime operation and night time or shut-down operation of the compressor motor 51 and the fan motor 162 in the compressor arrangement.

The starter 158 is activated through the beater switch 164. The main on and off switch is illustrated at 168, the center post thereof being the hot line $L_1$. The switch 168, as indicated, is in its "OFF" position and can be thrown to a "clean-out" position and an "automatic" position, shown by the circuitry. The reference numeral 170 indicates a micro switch operating through the timer 172. The on and off switch for the evaporator fan motor 174 is illustrated at 178 while the on and off switch for the pump mix composition motor 96 is shown at 180. Closing the night switch 142 connects the timer 172 to the low temperature thermostat 140 controlling the freezing chamber 26. The solenoid valve control for the freezer chamber 26 is illustrated at 124. The beater switch 164, timer 172, main switch 168, evaporator fan switch 178, pump motor switch 180 and the night switch 142 and micro switch 170 are all located on the front panel of the machine as illustrated in FIG. 1 by the location of illustrative switch 34.

At the top center of the diagram the freezing chamber medium temperature thermostat 130 is illustrated. The remaining parts of the circuit comprise the high pressure cut-outs 192 and 194 for the compressor motor 51, and the time delay relay 196. So connected the cut-out 192 prevents overload of the compressor motor 51 during daytime operation and the cut-out 194 performs the same function during the night or other periods of non-use of the dispenser. These cut-outs also respond in the event of a failure of water pressure when using a water-cooled compressor. The components of the circuit shown in FIG. 5, except for the thermocouples controlling the thermostats, the switches, and the solenoid valves can be contained in a circuit box, such as illustrated at 200 in FIG. 3.

The micro switch 170 is normally open and is connected by means of an actuating rod or other means (not illustrated) to the dispensing valve 20 so as to be closed when product is drawn from the freezing chamber to activate the refrigeration system for a predetermined time during product withdrawal. The micro switch 170 also simultaneously activates said beater motor 84 and mix the motor 96 for the composition pump 60 during periods of product withdrawal to force product from the machine by incoming mix composition to replace withdrawn product and maintain the system filled with mix or freezing product at all times during use. This insures that incoming mix will be immediately processed and frozen. The timer relay 196 controls these cycles of operation and after the set time shuts off the momentary refrigeration and places it back under the control of the thermostat 130. These cycles are of about 10 seconds duration and set to start upon opening the valve 20, continue during the dispensing and terminate 10 seconds after the valve 20 is closed. Release of the actuating handle 22 of the valve 20 allows the micro switch to open and the timed cycle to begin.

It is apparent that the circuit of FIG. 5 is capable of the following functions. The main on and off selector 168 has three positions. In one position (shown in FIG. 5) the switch is off; in the second position when connected to the left hand terminals, the switch is in automatic mode and in the third position, when connected to the right hand terminals, the switch is in the clean-out mode wherein the beater motor 84 only is operated while flushing the system with a sanitizing solution. At start-up, the beater motor switch 164 can be closed or open, the main switch is in the automatic mode, the evaporator fan switch 178 can be open or closed, the pump motor switch 180 is closed. The night switch 142 is in its "OFF" position or closed. Thus oriented on start-up of the machine, assuming it has been sanitized, a filled mix container is placed in the compartment 48 and connected to the dip tube 58. The pump 60 conveys the mix composition into the freeze chamber 26 and air is bled from the system by periodically opening the valve 20. The beater motor switch 164 is then closed as well as the evaporation fan switch 178 and the pump motor switch 180, while the main switch 168 is in automatic mode.

This activates the compressor 50, the fan motors 162 and 174 to start up the refrigeration systems. The freezer chamber 26 is maintained at about 18°F by the thermostat 140, while the refrigeration compartment 42 is maintained at about 38°F by the thermostat 134. Upon shut-down for the periods of non-use the night switch is opened or turned to its "ON" position as illustrated in FIG. 5, disconnecting the thermostat 140 and actuating the thermostat 130 for control of the freezing chamber at a temperature of about 38°F. The beater switch 164 is opened and this disconnects the beater motor 84 so that the product in the freezing chamber is not agitated during standby. All that is necessary is to close the night switch and the beater motor switch 164 to ready the machine for daytime use.

A feature of the invention is the elimination of the requirement for daily cleaning, now required for most self-serve machines. The system is closed so that there is a minimum of exposure to air. All parts contacted by the mix or product are refrigerated. Tests by various state health departments indicate that the bacterial count in various parts of the instant show no change after a week's operation. The daily chores of shutting down the machine at night, draining, dismantling the parts, cleaning and sanitizing, followed by assembly, flushing and refilling are eliminated. The time lost in bringing the machine down to freezing temperature is no longer a problem. Start-up after a period of non-use takes only about 4 minutes as opposed to 30 or 40 minutes with prior machines. In the prior art machines it is necessary to operate the compressor and the beater motor for each cooling cycle called for by the thermostat to keep the product cold but not freezing during periods of non-use. This continuous working of the product has a deleterious effect on the taste, texture and consistency of the product.

All cleaning operations are also simplified since, after draining the freezer by means of drain 202 (FIG. 1) a container of warm water is connected to the dip tube 58 and passed through the machine by the pump 60 with the beater motor on, as controlled by the separate switch 164. This is followed by a container of sanitizing solution and a warm water rinse. The effluents may be drawn off at valve 20 or drain 202, or both. Then a container or mix is connected to the dip tube, all refrigeration units activated, the night switch closed and after bleeding off air and withdrawal of some mix for final flushing, the unit is ready for use. It is only necessary to dismantle the pump 60 to lubricate the piston and seals at periodic intervals of about 30 days. The seals in the freezer chamber need attention about every 6 months.

What is claimed is:

1. A soft serve confectionary machine comprising:
a freezing chamber in association with a refrigeration chamber;
said refrigeration chamber providing space for at least one container of mix composition to be processed in said freezing chamber;
pump means within said refrigeration chamber and connectable with said container to convey mix composition to said freezing chamber for processing and dispensing;
refrigeration means operably connected to said chambers including;
compressor means having its high pressure discharge connected to a condenser and a receiver;
a main control valve controlling liquified refrigerant from said receiver;
a first branch conduit connected to a refrigeration coil in said freezing chamber;
a return conduit connected to the intake of said compressor means;
thermostatic control means for said branch conduit operable to maintain said freezing chamber at freezing temperature in one mode of operation and at refrigeration temperature in a second mode of operation;
a second branch line connected to a refrigeration coil in said refrigeration chamber;
a return conduit connected from said refrigeration coil to the said intake of said compressor; and
independent thermostatic control means to maintain said refrigeration chamber at a refrigeration temperature.

2. A soft serve confectionary machine in accordance with claim 1 in which:
said freezing chamber includes a power agitator; and
including switch means operable to disconnect said power agitator during said second mode of operation.

3. A soft serve confectionary machine comprising:
a freezing chamber in association with a refrigeration chamber;
said refrigeration chamber providing space for at least one container of mix composition to be processed in said freezing chamber;
pump means within said refrigeration chamber and connectable with said container to convey mix composition to said freezing chamber for processing and dispensing;
a power operated beater impeller in said freezing chamber;
refrigeration means operably connected to said chambers including compressor means having its high pressure discharge connected to a condenser and a receiver;
a main control valve controlling liquified refrigerant from said receiver;
a first branch conduit connected to a refrigeration coil in said freezing chamber;
a return conduit connected to the intake of said compressor means;
thermostatic control means for said first branch conduit operable to maintain said freezing chamber at a predetermined freezing temperature in one mode of operation and at a predetermined refrigeration temperature in a second mode of operation;
a second branch line connected to a refrigeration coil in said refrigeration chamber;
a return conduit connected from said refrigeration coil to said intake of said compressor;
a second thermostatic control means to maintain said refrigeration chamber at said predetermined refrigeration temperature; and
control means for said refrigeration means operable to maintain said refrigeration chamber at said refrigeration temperature and said freezing chamber at said freezing temperature in said one mode of operation and operable to maintain both said chambers at said refrigeration temperature in a second mode of operation and disconnect said power-operated beater impeller in said freezing chamber.

4. A soft serve confectionary machine in accordance with claim 3, including:
  switch means associated with said control means operable to connect said control means into said modes of operation.

5. A soft serve confectionary machine in accordance with claim 4 including:
  time cycle relay means with said control means operable to actuate said refrigeration means and pump means during predetermined cycles of product withdrawal; and
  means to actuate said time cycle relay means.

6. A soft serve confectionary machine in accordance with claim 5 including:
  a product withdrawal valve for said freezing chamber; and
  said means to activate said time cycle relay means comprises switch means actuated by said product withdrawal valve.

7. A soft serve confectionary machine in accordance with claim 6 in which:
  said time cycle relay means is operable to start upon opening of said product withdrawal valve and said timed cycle begins upon closing said product withdrawal valve.

* * * * *